(12) United States Patent
Wu

(10) Patent No.: US 9,004,777 B2
(45) Date of Patent: Apr. 14, 2015

(54) OPTICAL FIBER COUPLING ASSEMBLY

(75) Inventor: Kai-Wen Wu, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 557 days.

(21) Appl. No.: 13/337,163

(22) Filed: Dec. 26, 2011

(65) Prior Publication Data

US 2013/0142485 A1 Jun. 6, 2013

(30) Foreign Application Priority Data

Dec. 2, 2011 (TW) .................................. 100144398

(51) Int. Cl.
*G02B 6/38* (2006.01)
*G02B 6/32* (2006.01)

(52) U.S. Cl.
CPC ................ *G02B 6/32* (2013.01); *G02B 6/3853* (2013.01); *G02B 6/3882* (2013.01); *G02B 6/3885* (2013.01)

(58) Field of Classification Search
USPC ..................................................... 385/59, 74
See application file for complete search history.

(56) References Cited

U.S. PATENT DOCUMENTS

2005/0041930 A1* 2/2005 Gherardini ...................... 385/59
2012/0008901 A1* 1/2012 Yu et al. ........................... 385/74

* cited by examiner

*Primary Examiner* — Sarah Hahm
(74) *Attorney, Agent, or Firm* — Novak Druce Connolly Bove + Quigg LLP

(57) ABSTRACT

An optical fiber coupling assembly includes a first optical fiber connector and a second optical fiber connector. The first optical fiber connector includes a first body having a first light incident surface, first optical lenses, first plugs, and second plugs. The first optical lenses, the first plugs, and the second plugs are formed on the first light incident surface. The first optical lenses are positioned between the first plugs, and the first plugs are positioned between the second plugs. The second plugs are longer than the first plugs. The second optical fiber connector includes a second body having a second light incident surface and second optical lenses formed on the second light incident surface. First engaging holes and second engaging holes are defined in the second light incident surface. The first plugs are inserted into the first engaging holes, and the second plugs are inserted into the second engaging holes.

7 Claims, 3 Drawing Sheets

OPTICAL FIBER COUPLING ASSEMBLY

BACKGROUND

1. Technical Field

The present disclosure relates to optics and, particularly, to an optical fiber coupling assembly.

2. Description of Related Art

An optical fiber coupling assembly is preferred for use in data transmission between many electronic devices due to its high transmission speed and signal integrity. Many optical fiber coupling assemblies include a first optical fiber connector and a second optical fiber connector coupled with the first optical fiber connector. Each optical fiber connector includes a body having a number of blind holes, a number of optical lenses positioned on a light incident surface of the body, and a number of optical fibers received in the respective blind holes and aligned with the respective optical lenses.

In assembly, the first optical fiber connector is inserted into and coupled with the second optical fiber connector, and the first optical lenses are aligned with the respective second optical lenses. However, the two optical fiber connectors are easily damaged if often inserted into and pulled out of the optical fiber connectors. If this happens, the first optical lenses may not be aligned with the respective second optical lenses. This decreases transmission efficiency of the optical fiber coupling assembly and reduces the lifespan of the optical fiber coupling assembly.

Therefore, it is desirable to provide an optical fiber coupling assembly, which can overcome or alleviate the above-mentioned problems.

DETAILED DESCRIPTION

Figure 1:
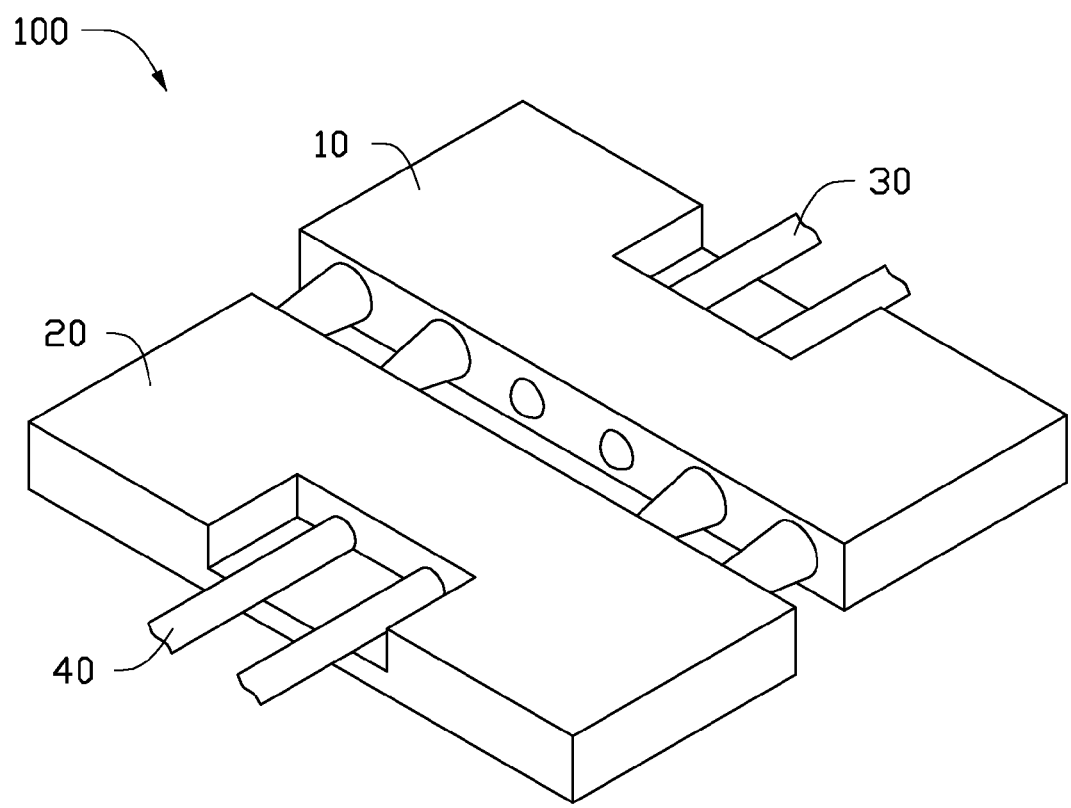
FIG. 1 is an isometric view of an optical fiber coupling assembly, according to an exemplary embodiment.

Referring to FIG. 1, an optical fiber coupling assembly 100, according to an exemplary embodiment, includes a first optical fiber connector 10 and a second optical fiber connector 20. The first optical fiber connector 10 couples with the second optical fiber connector 20 to allow the passage of digital signals in the form of light.

Figure 2:
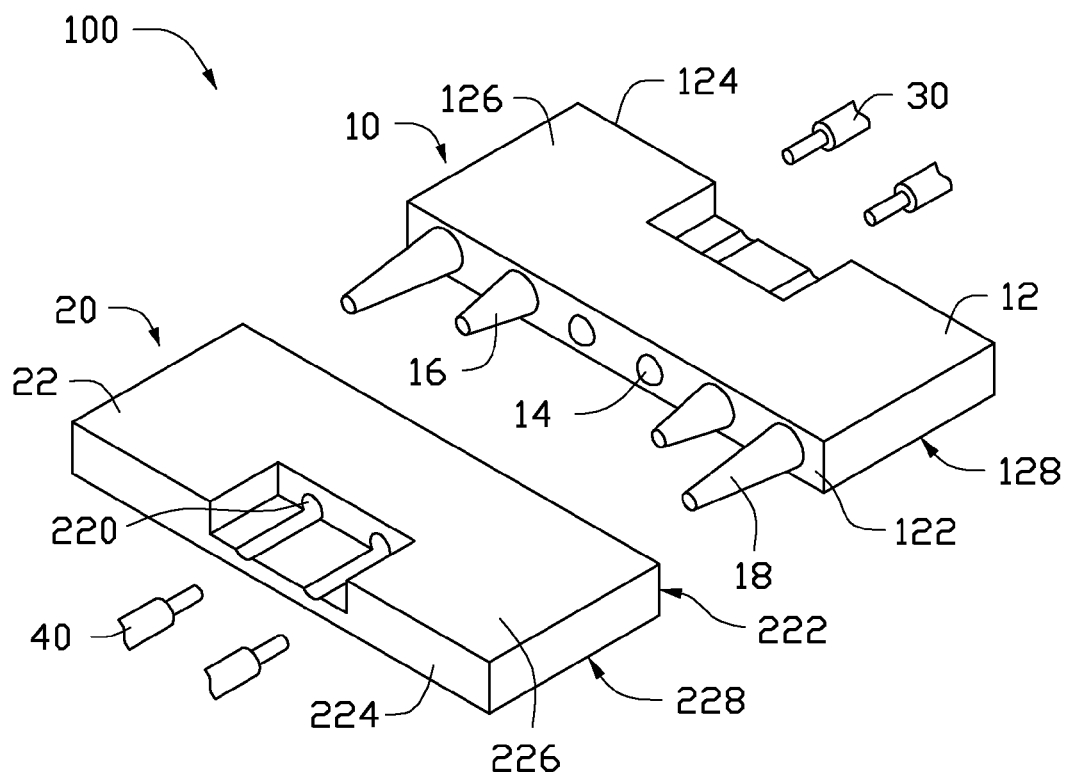
FIG. 2 is an exploded view of the optical fiber coupling assembly of FIG. 1.
Figure 3:
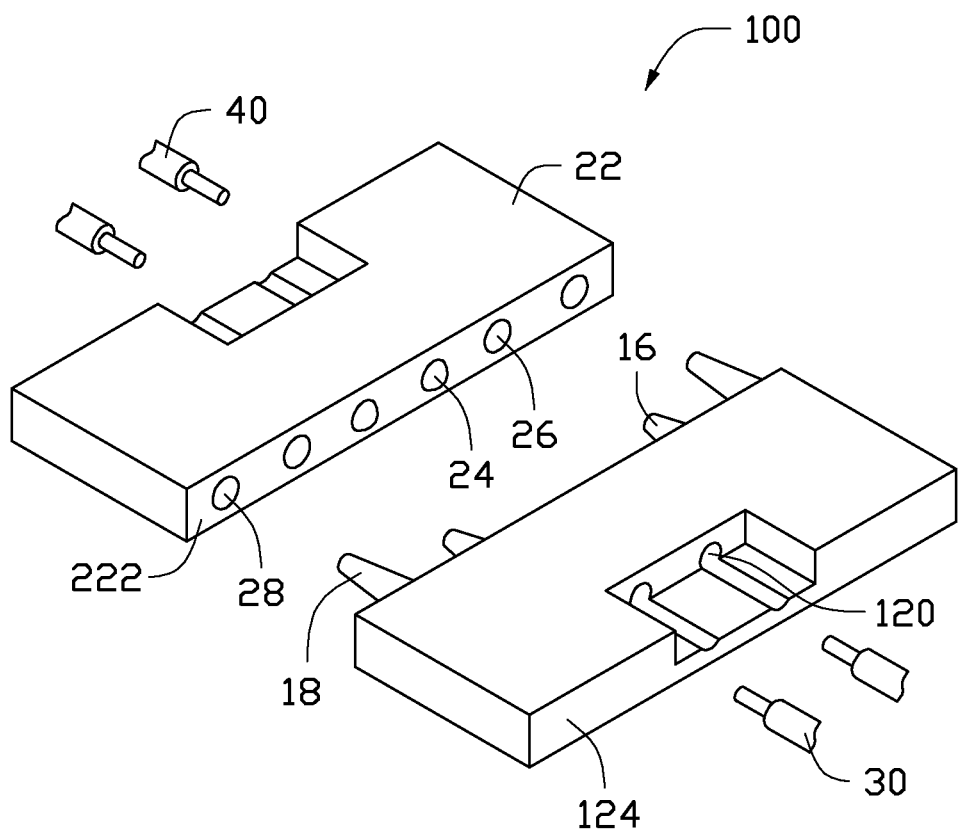
FIG. 3 is similar to FIG. 2, but viewed from another aspect.

Referring to FIGS. 2-3, the first optical fiber connector 10 includes a first body 12, two first optical lenses 14, two first plugs 16, two second plugs 18, and two first optical fibers 30.

The first body 12 is substantially cuboid. The first body 12 includes a first light incident surface 122, a first back surface 124, a first top surface 126, and a first bottom surface 128. The first light incident surface 122 is substantially parallel to the first back surface 124. The first top surface 126 is substantially parallel to the first bottom surface 128. The first light incident surface 122 perpendicularly connects the first top surface 126 to the first bottom surface 128. The first back surface 124 perpendicularly connects the first top surface 126 to the first bottom surface 128. Two first blind holes 120 are defined in the middle of the first body 12 and arranged along a direction from the first back surface 124 to the first incident surface 122. The first blind holes 120 pass through the first back surface 124.

The two first optical lenses 14 are formed on the first light incident surface 122 and are apart from each other. The first optical lenses 14 are aligned with the respective first blind holes 120.

The first plugs 16 perpendicularly extend from the first light incident surface 122 and are apart from each other. The two first plugs 16 are arranged at opposite sides of the two first optical lenses 14 along a lengthwise direction of the first light incident surface 122. That is, the two first optical lenses 14 are positioned between the two first plugs 16 along the lengthwise direction of the first light incident surface 122. In this embodiment, each of the first plugs 16 is a truncated cone, and each of the first plugs 16 tapers along a direction from the first back surface 124 to the first light incident surface 122. That is, the sectional area of each of the first plugs 16 decreases along the direction from the first back surface 124 to the first light incident surface 122.

The two second plugs 18 perpendicularly extend from the first light incident surface 122 and are apart from each other. The two second plugs 18 are arranged at opposite sides of the two first plugs 16 along the lengthwise direction of the first light incident surface 122. That is, the two first plugs 16 are positioned between the two second plugs 18 along the lengthwise direction of the first light incident surface 122. In this embodiment, each of the second plugs 18 is a truncated cone, and each of the second plugs 18 tapers along the direction from the first back surface 124 to the first light incident surface 122. That is, the sectional area of each of the second plugs 18 decreases along the direction from the first back surface 124 to the first light incident surface 122. Each of the second plugs 18 is longer than each of the first plugs 16.

The first optical fibers 30 are received in the respective first blind holes 120 and aligned with the respective first optical lenses 14.

The second optical fiber connector 20 includes a second body 22, two second optical lenses 24, and two second optical fibers 40.

The second body 22 is substantially cuboid. The second body 22 includes a second light incident surface 222, a second back surface 224, a second top surface 226, and a second bottom surface 228. The second light incident surface 222 is substantially parallel to the second back surface 224. The second top surface 226 is substantially parallel to the second bottom surface 228. The second light incident surface 222 perpendicularly connects the second top surface 226 to the second bottom surface 228. The second back surface 224 perpendicularly connects the second top surface 226 to the second bottom surface 228. Two second blind holes 220 are defined in the middle of the second body 22 and arranged along a direction from the second back surface 224 to the second incident surface 222. The second blind holes 220 pass through the second back surface 224. Two first engaging holes 26 and two second engaging holes 28 are defined in the second light incident surface 222.

The two second optical lenses 24 are formed on the second light incident surface 222 and are apart from each other. The second optical lenses 24 are aligned with the respective second blind holes 220.

The first engaging holes 26 are arranged at opposite sides of the two second optical lenses 24 along a lengthwise direction of the second light incident surface 222. That is, the two second optical lenses 24 are positioned between the two first engaging holes 26 along the lengthwise direction of the second light incident surface 222. In this embodiment, each of the first engaging holes 26 is a truncated cone and shaped to fit to the corresponding first plug 16. The diameter of each of the first engaging holes 26 decreases along a direction from the second light incident surface 222 to the second back surface 224. The depth of each of the first engaging holes 26 is less than the length of the corresponding first plug 16. That is, if the first plugs 16 are plugged into the respective first engaging holes 26, a portion of each of the first plugs 16 will be exposed at the corresponding first engaging holes 26.

The second engaging holes 28 are arranged at opposite sides of the two first engaging holes 26 along a lengthwise direction of the second light incident surface 222. That is, the two first engaging holes 26 are positioned between the two second engaging holes 28 along the lengthwise direction of the second light incident surface 222. In this embodiment, each of the second engaging holes 28 is a truncated cone and shaped to fit to the corresponding second plug 18. The diameter of each of the second engaging holes 28 decreases along a direction from the second light incident surface 222 to the second back surface 224. The depth of each of the second engaging holes 28 is less than the length of the corresponding second plug 18. That is, if the second plugs 18 are plugged into the respective second engaging holes 28, a portion of each of the second plugs 18 will be exposed at the corresponding second engaging holes 28. In addition, the depth of each of the second engaging holes 28 is larger than that of each of the first engaging holes 26.

The second optical fibers 40 are received in the respective second blind holes 220 and aligned with the respective second optical lenses 24.

When the first optical fiber connector 10 is inserted into the second optical fiber connector 20, first, the second plugs 18 plug into the respective second engaging holes 28, a first friction force is produced and an initial alignment between the first optical fiber connector 10 and the second optical fiber connector 20 is achieved. Then, the first plugs 16 plug into the respective first engaging holes 26, a second friction force is produced and an accurate alignment between the first optical fiber connector 10 and the second optical fiber connector 20 is achieved. Finally, the second plugs 18 are further plugged into the respective second engaging holes 28 until the second plugs 18 contact the bottoms of the second engaging holes 28, the first plugs 16 are further plugged into the respective first engaging holes 26 until the first plugs 16 contact the bottom of the first engaging holes 26. The first light incident surface 122 faces toward the second light incident surface 222, and the two first optical lenses 14 are aligned with the two respective second optical lenses 24. During this process, the initial alignment and the accurate alignment cooperatively assure the optical coupling accuracy between the first optical lenses 14 and the second optical lenses 24. Furthermore, the second plugs 18 are generally easily damaged before the first plugs 16, as the first friction force is larger than the second friction force. If the second plugs 18 are damaged, the first plugs 16 can continue to work properly, and the first optical lenses 14 are accurately aligned with the respective second optical lenses 24. Therefore, the transmission efficiency of the optical fiber coupling assembly 100 can be assured and the lifespan of the optical fiber coupling assembly 100 can be increased.

When in use, if the first optical fiber connector 10 is used as a signal emitting terminal, and the second optical fiber connector 20 is used as a signal receiving terminal. Light from the first optical fiber 30 passes through the corresponding first optical lens 14, the corresponding second optical lens 24, and reaches the corresponding second optical fiber 40, thereby achieving the data transmission. Similarly, if the first optical fiber connector 10 is used as a signal receiving terminal, and the second optical fiber connector 20 is used as a signal emitting terminal. Light from the second optical fiber 40 passes through the corresponding second optical lens 24, the corresponding first optical lens 14, and reaches the corresponding first optical fiber 30, thereby achieving the data transmission.

Even though numerous characteristics and advantages of the present embodiments have been set fourth in the foregoing description, together with details of the structures and functions of the embodiments, the disclosure is illustrative only, and changes may be made in details, especially in the matters of shape, size, and the arrangement of parts within the principles of the disclosure to the full extent indicated by the broad general meaning of the terms in which the appended claims are expressed.

What is claimed is:

1. An optical fiber coupling assembly comprising:
a first optical fiber connector comprising:
    a first body comprising a first light incident surface;
    two first optical lenses formed on the first light incident surface;
    two first plugs extending from the first light incident surface and apart from each other, the first plugs arranged at opposite sides of the first optical lenses along a lengthwise direction of the first light incident surface; and
    two second plugs extending from the first light incident surface and apart from each other, the two first plugs sandwiched between the two second plugs along a lengthwise direction of the first light incident surface, each of the second plugs being longer than each of the first plugs; and
a second optical fiber connector comprising:
    a second body comprising a second light incident surface facing toward the first light incident surface; and
    two second optical lenses formed on the second light incident surface and aligned with the respective first optical lenses, two first engaging holes corresponding to the first plugs and two second engaging holes corresponding to the two second plugs defined in the second light incident surface, the two first engaging holes sandwiched between the two second engaging holes, the first plugs inserted into the corresponding first engaging holes, and the second plugs inserted into the corresponding second engaging holes.

2. The optical fiber coupling assembly as claimed in claim 1, wherein each of the first plugs is a truncated cone, and each of the first plugs tapers along a direction from the first back surface to the first light incident surface.

3. The optical fiber coupling assembly as claimed in claim 2, wherein each of the second plugs is a truncated cone, and each of the second plugs tapers along a direction from the first back surface to the first light incident surface.

4. The optical fiber coupling assembly as claimed in claim 2, wherein the first plugs are separated from the second plugs, and the first engaging holes are separated from the second engaging holes by a portion of the second body.

5. The optical fiber coupling assembly as claimed in claim 4, wherein the first optical fiber connector further comprises two first optical fibers, the first body further comprises a first back surface substantially parallel to the first light incident surface, a first top surface, and a first bottom surface substantially parallel to the first top surface, the first light incident surface perpendicularly connecting the first top surface to the first bottom surface, the first back surface perpendicularly connecting the first top surface to the first bottom surface, two first blind holes are defined in the first body and arranged along a direction from the first back surface to the first incident surface, and the first optical fibers are received in the respective first blind holes and aligned with respective first optical lenses.

6. The optical fiber coupling assembly as claimed in claim 5, wherein the second optical fiber connector further comprises two second optical fibers, the second body further comprises a second back surface substantially parallel to the second light incident surface, a second top surface, and a second bottom surface substantially parallel to the second top surface, the second light incident surface perpendicularly connecting the second top surface to the second bottom surface, the second back surface perpendicularly connecting the second top surface to the second bottom surface, two second blind holes are defined in the second body and arranged along a direction from the second back surface to the second incident surface, and the second optical fibers are received in the respective second blind holes and aligned with respective second optical lenses.

7. The optical fiber coupling assembly as claimed in claim 2, wherein the depth of each of the first engaging holes is less than that of each of the second engaging holes.

* * * * *